United States Patent [19]

Wasel-Nielen et al.

[11] 4,294,808

[45] Oct. 13, 1981

[54] PRODUCTION OF ANTICORROSIVE PIGMENTS CONTAINING PHOSPHORUS

[75] Inventors: Horst-Dieter Wasel-Nielen; Renate Adrian; Herbert Panter, all of Hürth; Gero Heymer, Erftstadt; Alexander Maurer; Raban von Schenck, both of Hürth, all of Fed. Rep. of Germany

[73] Assignee: Hoechst Aktiengesellschaft, Fed. Rep. of Germany

[21] Appl. No.: 76,307

[22] Filed: Sep. 17, 1979

[30] Foreign Application Priority Data

Sep. 20, 1978 [DE] Fed. Rep. of Germany ....... 2840820

[51] Int. Cl.$^3$ ..................... C01B 25/26; C01B 25/32; C01B 25/36; C01B 25/37
[52] U.S. Cl. .............................. 423/305; 106/14.12; 106/288 B; 106/292; 106/304; 423/307; 423/308; 423/309; 423/311
[58] Field of Search ............... 423/308, 309, 311, 305, 423/307, 312; 422/224, 225, 227; 106/14.12

[56] References Cited

U.S. PATENT DOCUMENTS

| | | | |
|---|---|---|---|
| 1,629,200 | 5/1927 | Buhtz | 422/224 |
| 1,768,957 | 7/1930 | Johnson | 422/225 |
| 1,806,381 | 5/1931 | Baensch | 422/224 |
| 1,926,266 | 9/1933 | Darsey | 423/309 |
| 2,703,275 | 3/1955 | Elliott et al. | 422/224 |
| 3,467,495 | 9/1969 | Nielsson | 423/309 |
| 3,510,264 | 5/1970 | Sprigg | 423/309 |
| 3,845,198 | 10/1974 | Marcot | 423/634 |

FOREIGN PATENT DOCUMENTS

682636  3/1964  Canada ......................... 423/309

OTHER PUBLICATIONS

Kirk-Othmer, Encyclopedia of Chemical Technology, Second Edition, vol. 22 (1970), p. 611.
Brauer, Handbook of Preparative Inorganic Chemistry, vol. 2, Second Edition (1965), pp. 1081, 1082.

*Primary Examiner*—O. R. Vertiz
*Assistant Examiner*—Wayne A. Langel
*Attorney, Agent, or Firm*—Connolly and Hutz

[57] ABSTRACT

The invention relates to a process for making phosphorus-containing anticorrosive pigments having a size of at most 20 microns by reacting one or more compounds of magnesium, calcium, strontium, barium, zinc, aluminum, iron, chromium or manganese with an oxygen acid of phosphorus or its alkali metal or ammonium salts at temperatures within the range 10° to 100° C. More particularly pigments consisting to an extent of at least 90% of particles with a size between 0.05 and 8 microns are produced by introducing an aqueous suspension or solution of the reactants into a dispersing means rotating at a speed of 3000 to 10,000 rpm, reacting the reactants by intimately mixing them, and separating and drying precipitated pigment.

8 Claims, No Drawings

PRODUCTION OF ANTICORROSIVE PIGMENTS CONTAINING PHOSPHORUS

Phosphorus-containing pigments are continuously gaining commercial interest as potential substitutes for lead- or chromate-containing anticorrosive pigments whose use is to an increasing extent being criticized for toxicological reasons. It has more particularly been suggested that difficulty soluble salts of the oxygen acids of phosphorus, such as orthophosphoric acid, pyrophosphoric acid, higher condensed phosphoric acids, phosphorus acid and hypophosphorous acid, should conveniently be used as phosphorus-containing anticorrosive pigments. Various of these products have indeed been found suitable for use as commercially reliable anticorrosive pigments.

It has been described that the efficiency of a good anticorrosive pigment is critically determined by various factors, among which particle size is the most relevant. In view of this, serious attempts have been made by the development of novel grinding methods and mills decisively to improve the fineness of the pigment particles. Two kinds of processes have been described, namely processes wherein the pigment is first dried and then ground, and wet grinding processes wherein the pigment is first ground and then dried. While effective use can indeed be made of these grinding processes, the fact remains that they are not free from adverse effects which reside in the need to carry out an additional process step with heavy expenditure of energy. In addition to this, ground material generally has a broad particle size distribution and often has ill-formed crystal fractions included therein. These are two facts which may well adversely affect the quality of the desirable final product.

One of the uses of anticorrosive pigments is in thin protective primings so that it is an imperative requirement for good anticorrosive pigments always to present a regular particle fineness in order to ensure an optimum coverage with the use of a minimum of pigment. In other words, it is necessary for the pigment to present a maximum surface area, i.e. to be available in the form of sufficiently small particles at the processing station, i.e. in contact with the article which is to be protected against corrosion, e.g. a metal surface. Pigment particles, e.g. phosphate particles which present an irregular particle size distribution are less effective and actually fail to produce a really reliable anticorrosive effect.

Typical representatives of more recently developed anticorrosive pigments of commercial interest are phosphates and more especially zinc phosphate of the formula $Zn_3(PO_4)_2 \cdot xH_2O$. Processes for making zinc phosphate from zinc oxide or zinc salts and phosphoric acid or phosphates have already been described in the art. These are processes, wherein the desired product is normally obtained in the form of coarse crystals which must subsequently be ground. This invariably produces the adverse effects described hereinabove. A two-step process for making zinc phosphate tetrahydrate, for example, has been described in British Patent Specification No. 962 182, wherein the starting materials are reacted initially at a temperature of 20° C. After reaction, the temperature of the reaction mixture is increased to more than 60° C., the solution being admixed with seed crystals to cause crystallization. In addition to this, in the process just described, it is necessary first to dehydrate and then to rehydrate the reaction mixture so as to obtain zinc phosphate tetrahydrate. Irrespective of the very expensive steps taken in this process, it is invariably necessary for the pigment to be ground for conversion to fine-particulate dispersible material.

A further process for making dicalcium phosphate dihydrate (calcium hydrogen phosphate dihydrate, $CaHPO_4 \cdot 2H_2O$) has been described in German Patent Specification No. 1 567 609, which provides for a certain pH-interval to be established and maintained during the reaction so as to obtain final product of predetermined particle size distribution. This process is, however, limited to the production of dicalcium phosphate dihydrate for use as a cleaning agent in tooth pastes and is not directly of assistance in the production of phosphates for use as anticorrosive agents, for which it is necessary to have a finer average particle size and which normally have to comply with particularly high demands.

Another process for making crystalline α-strontium hydrogen phosphate and its use in the production of luminous materials has been described in German Patent Specification "Auslegeschrift" No. 2 051 641. In this process, it is necessary for the reaction mixture to be admixed with a certain proportion of an aminopolycarboxylic acid so as to obtain particles of a given form, size and particle size distribution. In other words, this is a process which calls for the use of an additional reactant, the resulting particles having an average size which is the smaller the higher the proportion of additional reactant added. Needless to say, the process is ultimately rendered more costly by the use of such additional reactant.

A still further process for making phosphate pigments has been described in German Patent Specification "Offenlegungsschrift" No. 2 655 458, wherein zinc ions are reacted with iron material. As a natural result, the resulting phosphate pigment consists of zinc phosphate and iron phosphate. In addition to this, it is necessary in this process to use an additional reactant, namely an alkaline earth metal hydroxide, for conversion of the pigment to dispersible material in an additional process step.

The present invention now provides a process which avoids the adverse effects that are associated with the grinding step and the use of an additional reactant in the production of phosphorus-containing anticorrosive pigments, especially zinc phosphate. More particularly, it is made possible by the present process to produce, as early as during the precipitation step, e.g. zinc phosphate which presents the particle size necessary for use as an anticorrosive pigment and a regular constant particle size distribution, at least 90% of the particles having a size between the narrow limits of 0.1 to 8 microns. This is a product of improved dispersibility and improved anticorrosive efficiency of which the use entails a series of further beneficial effects.

In accordance with our present invention, we have found that zinc phosphate which combines in itself dispersibility with a particularly narrow particle size distribution is unexpectedly obtained by converting zinc oxide, with agitation and with the use of water or mother liquor, to a concentrated suspension, placing the suspension in a vessel with stirrer and maintaining its concentration constant by thorough agitation, and reacting the suspension with concentrated phosphoric acid in a rapidly rotating dispersing means (3000 to 10,000 rpm), e.g. a screw pump. By the structure selected for the dispersing means and by the present process it is ensured that the reactants are intimately intermixed and undergo reaction within a minimum period of time, e.g. while passing through the screw pump.

Zinc oxide and phosphoric acid unexpectedly undergo complete reaction substantially without any undesirable crystal growth later during the process, irrespective of the extremely short sojourn time of the reactants in the reaction zone. To ensure this, care should be taken to avoid the presence of any excess of phosphoric acid, which may adversely affect the quality of the resulting product, in the reaction zone. To this end, it is good practice to use zinc oxide and phosphoric acid from the onset in a molar ratio greater than 1.5, for preparation of the zinc oxide suspension. Failing this, care should be taken that the reaction zone, i.e. the dispersing means, is fed with exactly metered quantities of phosphoric acid, which may be supplied e.g. with the use of a nozzle. Only in this manner is it possible to ensure complete and more especially rapid reaction in the dispersing means and the formation of zinc phosphate of very narrow particle size distribution and dispersibility.

A further technically beneficial effect of the present invention resides in the fact that use is made of a concentrated suspension and that very limited quantities of mother liquor are produced. This has favorable effects especially on the period necessary for filtration of the zinc phosphate and on the dimensions to be selected for the reactors.

The process of the present invention is normally carried out at temperatures within the range 10° to 100° C., higher temperatures within said range being preferred. Serious adverse effects are, however, not liable to be encountered in the present process even if it should proceed for a short while at temperatures outside the range specified. Phosphoric acid with a strength within the range 20 to 85 weight % is used in the present process, and the zinc oxide suspension preferably has a concentration within the range 10 to 50 weight %. As regards the resulting reaction mixture, it is not allowable for it to present an excessively high viscosity, which would be liable to affect reliable passage through the dispersing means, or an excessively high fluidity which would be liable to affect the quality of the final product.

The particular fineness of the pigment particles and narrow particle size distribution are properties which are typical of the zinc phosphate so made and which make it especially suitable for use as an anticorrosive agent. More particularly, the product of this invention is obtained in the form of particles with a size of at most 20 microns which is highly desirable inasmuch as the quality of anticorrosive primings, of which some have an approximate thickness of only 25 microns, has been found to be considerably impaired even in those cases in which they are made from material with only minor proportions of particles larger than 20 microns therein. As a result of its particle fineness and narrow particle size distribution, the zinc phosphate of this invention is very readily dispersible with the aid of a dissolver. This is a very modern, rapid and commercially attractive method for preparing primings.

After precipitation, the product is subjected to customary filtration or centrifugation for separation from its mother liquor which can directly be recycled without any need for it to be purified or processed. This is a further beneficial effect of this invention. Next, the anticorrosive pigment is dried in customary units; the drying temperature is selected in accordance with the content of water of crystallization desired for the final product.

The present process is normally carried out discontinuously, the reaction mixture being continuously circulated until the reaction is complete, by intensively pumping it through the dispersing means. It is also possible, however, to effect the present process in continuous fashion with the use of the reactor unit and processing steps described herein.

The process of this invention and its technically beneficial effects are of assistance not only in the production of $Zn_3(PO_4)_2 \cdot xH_2O$, but also in the manufacture of a wide variety of other phosphorus-containing anticorrosive pigments. In this latter case, it is possible for the metallic reaction component to be used in the form of the respective oxide or hydroxide or salt, e.g. chloride or acetate, the phosphorus-containing reaction components being selected from orthophosphoric acid, pyrophosphoric acid, higher condensed phosphoric acids, phosphorous acid or hypophosphorous acid or an alkali metal or ammonium salt of these oxygen acids of phosphorus. It is also possible to produce these alkali metal or ammonium salts in situ by means of an alkali liquor or ammonia and an oxygen acid of phosphorus.

The present invention relates more particularly to a process for making phosphorus-containing anticorrosive pigments having a particle size of at most 20 microns by reacting one or more compounds of a metal selected from the group consisting of magnesium, calcium, strontium, barium, zinc, aluminum, iron, chromium or manganese with an oxygen acid of phosphorus or an alkali metal or ammonium salt of said acid at temperatures within the range 10° to 100° C., which comprises: intimately mixing and thereby reacting an aqueous suspension or solution of the reactants inside a dispersing means rotating at a speed of 3000 to 10,000 rpm, separating and drying in known manner precipitated pigment, the pigment consisting to an extent of at least 90% of particles with a size between 0.05 to 8 microns.

Preferred features of the present process provide:

(a) for the two reactants to be introduced jointly into the dispersing means, in the event of the process being effected continuously;

(b) for one of the reactants to be circulated through the dispersing means and for it to be admixed with an aqueous solution of the other, in the event of the process being effected discontinuously;

(c) for the reaction mixture to be circulated by pumping it through the dispersing means over a period of 0.5 to 5, preferably 1 to 2 hours;

(d) for mother liquor, which is retained after separation of precipitated pigment, to be used for dissolving or suspending the reactants therein;

(e) for zinc phosphate of the formula $Zn_3(PO_4)_2 \cdot xH_2O$ (x stands for a number of 0 to 4) to be produced by reacting, inside the dispersing means, an aqueous 10 to 50 weight %, preferably 20 to 40 weight % suspension of zinc oxide with orthophosphoric acid of 20 to 85, preferably 75 to 85, weight % strength, a molar ratio of zinc oxide to orthophosphoric acid of at least 1.5 being established so as to avoid acid pH-values in the reaction mixture;

(f) for the zinc oxide suspension to be circulated through the dispersing means with the aid of a pump and to be admixed therein with metered proportions of orthophosphoric acid; and (g) for the dispersing means to comprise a screw pump or emulsifying means.

EXAMPLE 1: (Preparation of $Zn_3(PO_4)_2.4H_2O$)

100 kg of ZnO and 300 l of water were thoroughly stirred into a suspension which was circulated for 1 hour by means of a screw pump rotating at a speed of 6000 rpm so as to intensify the suspending effect. Next, the zinc oxide suspension was admixed over 2 hours inside the screw pump with 94.4 kg of orthophosphoric acid of 85 weight % strength which was admitted in metered proportions and underwent spontaneous reaction therein. The $ZnO/H_3PO_4$-molar ratio was stoichiometric, equal to 1.5. The temperature rose from 20° to 80° C. After the phosphoric acid had been added, the zinc phosphate suspension was circulated by pumping for about a further 30 minutes and then stored in an intermediate container. Next, zinc phosphate was separated from its mother liquor which was recycled to a container receiving the ZnO-suspension. The solid matter so obtained was dried as usual at 85° C. in a flue bed drier. A zinc phosphate A which had the following particle size distribution (determined by means of a whizzer air separator) was obtained: 0.05-8 microns=94.9%; 8-12 microns=4%; 12-15 microns=1%.

EXAMPLE 2: (Preparation of $Zn_3(PO_4)_2.4H_2O$)

183 kg of ZnO was suspended in 600 l of water with thorough agitation and circulation by pumping with the aid of a screw pump rotating at a speed of 6000 rpm. A uniformly concentrated suspension was obtained which was admixed within two hours and by means of the screw pump with 150 kg of phosphoric acid of 85 weight % strength. The reaction occurred spontaneously. The $ZnO/H_3PO_4$-molar ratio was overstoichiometric, equal to 1.73. The temperature rose to 70° C. After reaction the zinc phosphate suspension was worked up and mother liquor was recycled to the container receiving ZnO-suspension, in the manner described in Example 1. A zinc phosphate pigment B which had the following particle size distribution was obtained: 0.05-8 microns=94.9%; 8-12 microns=4%; 12-15 microns=1%.

EXAMPLE 3: (Preparation of $Zn_3(PO_4)_2.4H_2O$)

160 kg of ZnO was suspended with thorough agitation in 500 l of water and the suspension was circulated for 1 hour with the use of a screw pump rotating at a speed of 6000 rpm so as to establish a uniform concentration. Next, the suspension was admixed inside the screw pump with 150 kg of phosphoric acid of 85 weight % strength, which was admitted through a nozzle structure. This took about 2 hours during which the temperature rose to about 80° C. The $ZnO/H_3PO_4$-molar ratio was stoichiometric, equal to 1.5. The whole was then processed as described in Example 1. A zinc phosphate C which had the following particle size distribution was obtained: 0.05-8 microns=94.8%; 8-12 microns=4%; 12-15 microns=1%.

EXAMPLE 4: (Comparative Example; preparation of $Zn_3(PO_4)_2.4H_2O$).

100 kg of ZnO was suspended with thorough agitation in 300 l of water and the suspension was stirred for 1 hour. Next, the suspension was admixed and reacted with thorough agitation over 2 hours with 94 kg of phosphoric acid of 85 weight % strength. The temperature rose to about 70° C. The $ZnO/H_3PO_4$-molar ratio was stoichiometric, equal to 1.5. After reaction, the whole was stirred for about a further 30 minutes, separated by centrifugation from its mother liquor, and the solid matter was dried at 85° C. as described in Example 1. A zinc phosphate D which had the following particle size distribution was obtained: 0.05-8 microns=69.9%; 8-12 microns=15%; 12-15 microns=5%; 15 microns=10%.

The product so obtained was ground with the use of an air jet mill and impeller breaker, respectively, and two zinc phosphates E and F which had the following particle size distribution were obtained:
E: 0.05-8 microns=79.8%; 8-12 microns=15%; 12-15 microns=5%.
F: 0.05-8 microns=74.9%; 8-12 microns=17%; 12-15 microns=8%.

EXAMPLE 5: (Preparation of $MgHPO_4.3H_2O$)

50 kg of phosphoric acid of 85 weight % strength was placed in a stirring vessel, mixed therein with 60 kg of sodium hydroxide solution of 50 weight % strength, and the whole was diluted with 200 l of water. The solution so obtained was cooled down to about 20° C. and circulated by means of a screw pump rotating at a speed of 6000 rpm. Next, 121.5 kg of a 34 weight % solution of $MgCl_2$ was added in metered proportions within 2 hours by means of the screw pump. The $MgCl_2/H_3PO_4$ molar ratio was stoichiometric, equal to 1:1. The whole was also admixed with 4.7 kg of a 10 weight % solution of NaOH, which was necessary to ensure stoichiometric conversion. The reaction temperature varied between 20° and 50° C. After all had been added, the suspension was circulated for 1 hour. Next, dimagnesium phosphate (magnesium hydrogen phosphate) was filtered off and dried at 50° C. A dimagnesium phosphate pigment which had the following particularly narrow particle size distribution was obtained: 0.05-8 microns=90.8%; 8-12 microns=6.5%; 12-15 microns=2.5% (Pigment G).

EXAMPLE 6: (Preparation of $CaHPO_4.2H_2O$)

50 kg of phosphoric acid of 85 weight % strength was placed in a stirring vessel and mixed therein with 60 kg of a 50 weight % solution of NaOH, and the whole was diluted with 200 l of water. The solution was cooled down to about 20° C. and circulated by means of a screw pump rotating at a speed of 6000 rpm. Next, 141.6 kg of a 34 weight % solution of calcium chloride and a further 47 kg of a 10 weight % solution of NaOH, which was necessary to ensure stoichiometric conversion, were added within 2 hours by means of the screw pump. The $CaCl/H_3PO_4$-molar ratio was stoichiometric, equal to 1:1. The whole was maintained at a temperature lower than 50° C. by cooling. Very fine dicalcium phosphate dihydrate (calcium hydrogen phosphate dihydrate) which was separated from its mother liquor by centrifugation, washed with water and dried at 30° C. was obtained. The product had the following particle size distribution: 0.05-8 microns=94.9%; 8-12 microns=4%; 12-15 microns=1%. (Pigment H).

EXAMPLE 7: (Preparation of $Zn_3(PO_4)_2.4H_2O$)

2.95 kg of zinc oxide was suspended, with agitation, in 25 l of water and the suspension was pumped over a period of 25 minutes through an emulsifying means rotating at a speed of 6000 rpm. Next, the suspension was admixed inside the emulsifying means with 2.7 kg of phosphoric acid of 85 weight % strength, which was added within 20 minutes. The $ZnO/H_3PO_4$-molar ratio was 1.55 and the temperature 40° C. The reaction mixture was pumped through the emulsifying means for a further 20 minutes, suction-filtered and washed with water. The resulting zinc phosphate was dried at 70° C. while mother liquor was recycled. A pigment I which had the following particle size distribution was obtained: 0.05–8 microns=90.9%; 8–12 microns=6.5%; 12–15 microns=2.5%.

EXAMPLE 8: (Preparation of $Zn_3(PO_4)_2.4H_2O$)

100 kg of ZnO was suspended with thorough agitation in 300 l of the mother liquor of Example 1 and a uniformly concentrated suspension which was circulated through a screw pump rotating at a speed of 6000 rpm was obtained. Next, the whole was admixed within 2 hours and inside the screw pump with 94.4 kg of phosphoric acid of 85 weight % strength. The reaction occurred spontaneously. The $ZnO/H_3PO_4$-molar ratio was 1.5. The temperature rose from 20° to 70° C. After the phosphoric acid had been added, the zinc phosphate suspension was circulated for about a further 30 minutes and then worked up in the manner described in Example 1. A zinc phosphate pigment J which had the following particle size distribution was obtained: 0.05–8 microns=94.8%; 8–12 microns=4%; 12–15 microns=1%.

EXAMPLE 9: (Testing anticorrosive pigments for dispersibility)

1. Test formulation

| | |
|---|---|
| 30.0 weight % | of alkyd resin (ALFTALAT AF 640; this is a registered Trade Mark of Hoechst Aktiengesellschaft, Frankfurt (M), Federal Republic of Germany); |
| 27.0 weight % | of anticorrosive pigment; |
| 18.0 weight % | of titanium dioxide; |
| 3.0 weight % | of modified montmorillonite as a gelatinizing agent (BENTONE (10 weight % strength); this is a registered Trade Mark of NL Industries Inc., New York, USA); |
| 1.0 weight % | of butanol; |
| 0.2 weight % | of methylisobutylketone; |
| 4.0 weight % | of aromatic hydrocarbons boiling within the range 187 to 213° C. (SHELLSOL AB; this is a registered Trade Mark of Deutsche Shell AG., Hamburg, Federal Republic of Germany); |
| 1.7 weight % | of a cobalt-containing siccative (SOLIGEN; this is a registered Trade Mark of Gebruder Borchers AG., Goslar, Federal Republic of Germany); |
| 15.1 weight % | of white spirit (hydrocarbons boiling within the range 145 to 200° C.; SANGAJOL; this is a registered Trade Mark of Deutsche Shell AG., Hamburg, Federal Republic of Germany |
| 100.0 weight % | |

2. Description of dispersibility test

The various components of the test formulation were placed in a 1 l-vessel, mixed at a low speed (less than 1000 rpm) of the dissolver and then dispersed for 15 minutes at a stirring velocity of 8400 rpm. The vessel had a diameter of 100 mm and the stirring disc had a diameter of 50 mm. After dispersion, the resulting varnish was poured over a glass plate or plastics sheet in inclined position, allowed to drop off and then dried at 60° C.

The dispersibility was rated along DIN-specification No. 53 209 (DIN stands for German Industrial Standard); evaluated was the formation of fisheyes. More particularly, a score increasing from m 0 to m 5 was assigned to the number of fisheyes, and a score increasing from g 0 to g 5 was assigned to their size. Very good results are assigned the score m 1/g 1 whilst absolutely poor results are assigned the score m 5/g 5.

3. Result of dispersibility test

| Pigment | Score assigned |
|---|---|
| A | m 1/g 2 |
| B | m 1/g 1 |
| C | m 1/g 1 |
| D | m 5/g 5 |
| E | m 1/g 2 |
| F | m 2/g 2 |
| G | m 1/g 2 |
| H | m 1/g 1 |
| I | m 2/g 1 |
| J | m 1/g 2 |

We claim:

1. In a process for making phosphorus-containing anticorrosive pigments having a size of at most 20 microns by reacting at least one compound of the metals selected from the group consisting of magnesium, calcium, strontium, barium, zinc, aluminum, iron, chromium and manganese with an oxygen acid of phosphorus or an alkali metal or ammonium salt of said acid at temperatures within the range 10° to 100° C., the improvement which comprises: intimately mixing and thereby reacting an aqueous suspension or solution of the reactants inside a dispersing means rotating at a speed of 3000 to 10,000 rpm, separating and drying precipitated pigment, the pigment consisting to an extent of at least 90% of particles with a size between 0.05 and 8 microns.

2. The process as claimed in claim 1, wherein an aqueous 10 to 50 weight % suspension of zinc oxide is reacted, inside the dispersing means, with orthophosphoric acid of 20 to 85 weight % strength and a molar ratio of zinc oxide to orthophosphoric acid of at least 1.5 is established so as to avoid acid pH-values in the reaction mixture, with the resultant formation of zinc phosphate of the formula $Zn_3(PO_4)_2.\times H_2O$, in which x stands for a number of 0 to 4 inclusive.

3. The process as claimed in claim 2, wherein the zinc oxide suspension is pumped through the dispersing means and admixed therein with metered proportions of orthophosphoric acid.

4. The process as claimed in claim 1, wherein the process is effected continuously and the two reactants are introduced jointly into the dispersing means.

5. The process as claimed in claim 1, wherein the process is effected discontinuously and one of the reactants is circulated through the dispersing means and admixed therein with an aqueous solution of the other.

6. The process as claimed in claim 1, wherein the reaction mixture is circulated by pumping it through the dispersing means over a period of 0.5 to 5 hours.

7. The process as claimed in claim 1, wherein mother liquor, which is retained after separation of precipitated pigment, is used for dissolving or suspending the reactants therein.

8. The process as claimed in claim 1, wherein the dispersing means is a screw pump or emulsifying means.

* * * * *